United States Patent [19]
Stafford et al.

[11] Patent Number: 5,148,657
[45] Date of Patent: Sep. 22, 1992

[54] DOG BOOT

[76] Inventors: Vondie A. Stafford, 620 Iberia Rd., Clarkson, Ky. 42726; Linda Dennis, 4411 S. OO E/W Rd. Lot No. 48, Kokoma, Ind. 46902

[21] Appl. No.: 656,742

[22] Filed: Feb. 19, 1991

[51] Int. Cl.⁵ ................................................ B68C 5/00
[52] U.S. Cl. .......................................... 54/82; 168/1; 168/18
[58] Field of Search .............. 168/1, 2, 3, 18; 54/82; 36/7.1 R, 111

[56] References Cited
U.S. PATENT DOCUMENTS

| | | | |
|---|---|---|---|
| 65,231 | 5/1867 | Jennings | 54/82 X |
| 615,437 | 12/1898 | Dillon | 54/82 X |
| 630,310 | 8/1899 | Agnew | 168/2 |
| 866,423 | 9/1907 | Bellatty | 168/1 X |

FOREIGN PATENT DOCUMENTS 2560745 9/1985 France ................................ 54/82

Primary Examiner—Robert P. Swiatek
Attorney, Agent, or Firm—Robert A. Spray

[57] ABSTRACT

A dog boot having as particular portions a foot, ankle and calf, the calf and ankle being large enough to accommodate the dog's paw passing through. The front of the boot calf has a vertical opening, and there is provided a vertical panel, free at the top, providing a tongue for covering the vertical opening in both an open or relatively closed condition, for insertion and removal of the dog's leg from the boot. A horizontal belt is fastenable at optionally chosen vertical places along the back of the boot; and a vertical strap affixed to the boot along the rear portion of the calf provides both a carrying strap and a cover to guard against snags of the hook-like Velcro area which provides the holder body for the horizontal belt. Other features add to the boot's advantages.

8 Claims, 2 Drawing Sheets

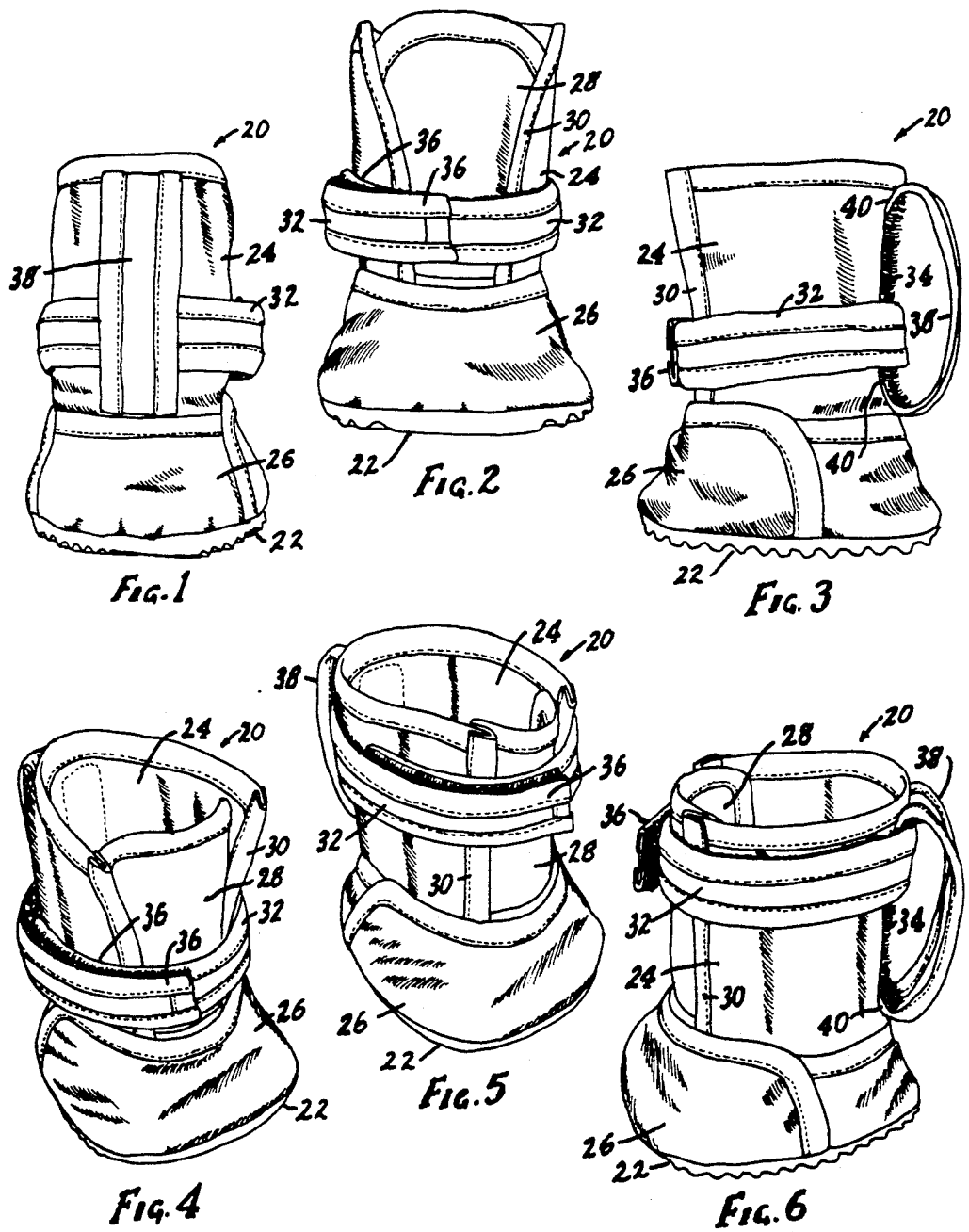

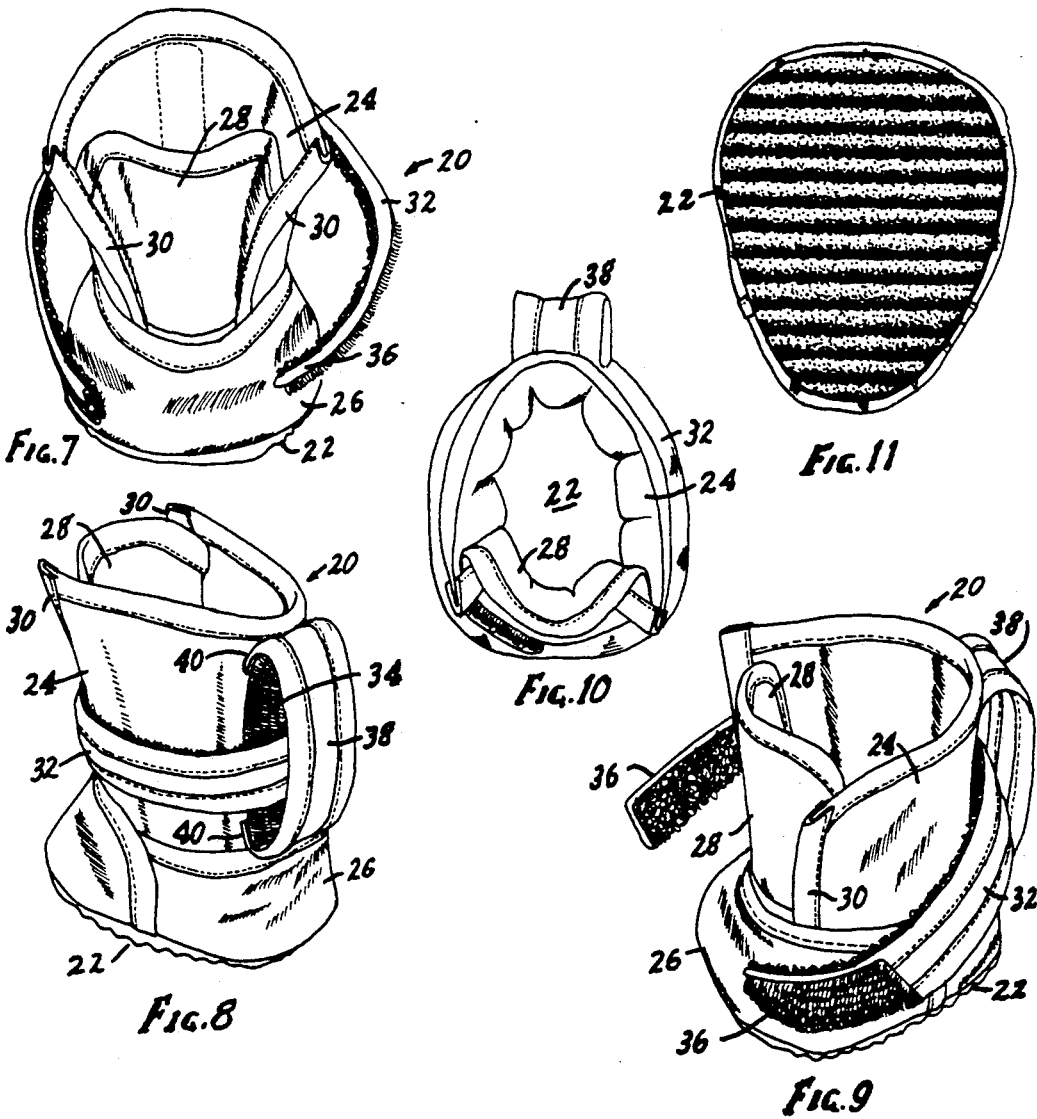

DOG BOOT

FIELD OF THE INVENTION

The present invention relates to accessories for pet animals, more particularly to boots for dogs.

From a consideration of the prior art in the field of dog boots, after the present invention was made, the inventors have found that dog boots have been a fascination of dog owners for over 50 years; and, although it would be hard to say, or even learn, that dogs really welcome such articles, dog owners have apparently found dog boots to be quite desirable.

For example, in the text of some of the prior art patents as cited below, it is asserted that boots give quite an advantage to dogs, such as protection from wintry weather, and the salt used in the street maintenance during wintry weather.

Other reasons are give to assert dog boots to be quite useful. And thus dog boots have been considered useful in a utilitarian sense, and, whether or not dog boots actually serve in a utilitarian sense of real physiological protection for a dog, at least dog boots provide usefulness in the sense of decorations to help fulfill some sort of an anthropomorphic kinship satisfaction to the dog owner.

SUMMARY OF PRESENT INVENTION CONCEPTS

According to the present invention, there is provided a dog boot having as particular portions a foot and a calf, interconnected by an ankle portion. The calf and ankle portion are large enough to accommodate the dog's paw passing through, and the front of the boot calf has a vertical opening; and there is provided a vertical panel, free at the top providing a tongue which covers the vertical opening in both an open or relatively large-calf condition or a closed or relatively small-calf condition.

A horizontal belt is fastenable at optionally chosen vertical places along the back of the boot; and a vertical strap affixed to the boot along the rear portion of the calf provides both a carrying strap and a cover to guard against snags of the hook-like Velcro area which provides the holder body for the horizontal belt.

Other features, as set forth herein, add to the boot's advantages.

THE PRIOR ART, AS HAVING CERTAIN COMPONENTS BUT NOT THE PRESENT CONCEPTS IN PARTICULAR

In a hindsight consideration of the present invention to determine its inventive and novel nature, it is not only conceded but emphasized that the prior art had details usable in this invention but only if the prior art had had the guidance of the present concepts of the present invention.

That is, it is emphasized that the prior art had several particulars which individually and accumulatively show the non-obviousness of this combination invention:

a. The prior art has long had various types of shoes and boots;
b. The prior art even had boots for dogs;
c. The prior art has long known of the commercial appeal of pet accessories, whether or not the dogs or other pets really like the accessories;
d. The prior art has long had manufacturing processes for processing plastics, rubber, cloth, Velcro fastening features, and other details useful in dog boots.

MORE PARTICULARS, AS SHOWING THIS INVENTION'S NATURE AS INVENTIVE

The prior art has known and used various concepts and details useful in dog boots if the present concepts had been known in the prior art, as noted above, and the existence of such multi-prior art is not only conceded, it is emphasized; for as to the novelty here of the invention as considered as a whole, a contrast to the prior art helps show its contrast to the present concepts, and emphasizes the advantages and the inventive significance of the present concepts as are here shown, and the nature of the concepts and their results can perhaps be easier understood.

Even further as indicating the inventive nature of the present concepts is the result of a Preliminary Patentability Search made in the Search files of the U.S. Patent Office, after this invention was made, and during the course of considering the desire and likelihood of patent protection.

The Search produced the following, all U.S. Patents:

| U.S. Pat. No. | Inventor | Grant date |
| --- | --- | --- |
| D167,092 | Monroe | 1952 |
| 2,064,566 | Richman | 1936 |
| 4,457,261 | Marshall | 1984 |
| 4,458,431 | Sinclair | 1984 |
| 4,543,911 | Marshall | 1985 |

However, there references fail to show or suggest the details of the present concepts, and a realistic consideration of their several differences from the present concepts may more aptly be described as teaching away from the present invention's concepts, in contrast to suggesting them, even as to a hindsight attempt to perceive suggestions from a backward look into the prior art.

Monroe shows a unitary boot with a holding strap, no tongue, apparently no size-adjustment, and apparently no open and closed condition, except that perhaps his vertical strips on the boot rear provide an open condition different from the front-enlarging feature of the present invention, and really no similarity to the present invention except in overall form.

Richman shows a boot for a dog, but no tongue, no adjustability, and no wrap-around holding strap; and its overall conical shape shows he would not likely use the present invention's features even by an attempted hindsight imposition.

Marshall U.S. Pat. No. 4,457,261 shows a "canine mitten" but it seems to be just a generally cylindrical sock with a warap-around closure belt.

Sinclair's "canine mittens" seem to be more comparable to a slipper than to a boot, with no tongue or similarity to other features of the boot of the present invention.

And Marshall U.S. Pat. No. 4,543,911, like the other Marshall article, is quite sack-like, with a wrap-around top closure strap, but hardly comparable at all to the present invention.

Accordingly, although various concepts of prior art could have been used if the combination had been conceived in the prior art, and conceded and emphasized to have been known and used in the prior art; nevertheless, the prior art not having had the particular combination of concepts and details as here presented, and shown as a novel combination different from the prior art and its suggestions, even only a fair amount of realistic humility, to avoid consideration of this invention improperly by hindsight, requires the concepts and achievement here to be realistically viewed as a novel combination, inventive in nature. And especially in this a realistic consideration when viewed from the position of a person of ordinary skill in this art at the time of this invention, and without trying to reconstruct this invention from the prior art without use of hindsight toward particulars not suggested by the prior art of all relevant fields.

BRIEF DESCRIPTION OF THE DRAWINGS

The above description of the novel and advantageous invention is of somewhat introductory and generalized form. More particular details, concepts, and features are set forth in the following and more detailed description of an illustrative embodiment, taken in conjunction with the accompanying drawing, which is of somewhat schematic and diagrammatic nature, for showing the inventive concepts:

FIGS. 1-3 are elevation views of a dog's boot according to the present invention, and more particularly, FIG. 1 is rear view;

FIG. 2 is a front view; and

FIG. 3 is a left side view of the boot.

FIGS. 4-9 are views thereof, as seen from somewhat above that of an elevation view, and more particularly, FIG. 4 is a view of the front and top of the boot, with its holding strap at a position of relatively low adjustment;

FIG. 5 is a view similar to that of FIG. 4 but with the holding strap in a position of relatively high adjustment;

FIG. 6 is a view as seen from the let side of the boot;

FIG. 7 is a view with the holding strap's ends unloosened, the view being a frontal view.

FIG. 8 is a view of the boot's left side and its rear; and

FIG. 9 is another view with the ends of the holding strap unloosened;

FIG. 10 is a top view of the boot; ad

FIG. 11 is a bottom view showing the boot's sole.

DESCRIPTION OF THE ILLUSTRATIVE EMBODIMENT

The drawings show the concepts of a dog boot 20 having, in combination, features of novelty and advantages.

As shown, the boot 20 has for its support a generally horizontal foot portion 22 and a generally vertical and cylindrical tubular portion providing a calf 24 for the boot 20.

A flaring ankle portion 26, i.e., flaring inwardly from the foot portion 22, interconnects foot portion 22 and the calf portion 24.

The size of calf portion 24 and the upper portion of the ankle portion 26 are of a relatively large cross-sectional size, i.e., large enough to accommodate a dog's paw to pass through them, and they are co-ordinated with respect to size and shape such that the lower end of the calf portion 24 generally fits with the upper end of the ankle portion 26; and the lower end of the ankle portion 26 is of the same general size and shape as that of the pole portion 22.

The calf portion 24 is of a flexible nature such that, during assembly of the boot 20 onto a dog's leg after the dog's paw has been moved downwardly through the calf portion 24, the calf portion may be tightened into a relatively smaller cross-sectional size so as to not only retain the boot 20 on the dog's foot, but so as to make it appear, by the calf 24 then appearing to be significantly smaller in cross-sectional size than the sole portion 22 and the lower end of the ankle portion 26, that the dog has a leg and paw whose size and shape relationship is that of a significantly larger paw than the cross-sectional size of the dog's leg.

Another feature as shown is that the front of the boot 20 is provided with a vertical panel 28 extending upwardly from at least as low as the lowest portion of the calf potion 24; and the panel 28 extends upwardly at least a substantial way toward the top of the calf portion 24. The panel 28 thereby provides a tongue for the boot, in providing a piece spanning the distance between the front edges 30 of the calf 24, the calf 24's vertically-extending opening in its front between the edges 30 providing size variation and also providing the calf 24 to change size, for being relatively open for travel in putting the paw into the boot 20 and removing it from the boot, and in tightening the boot 20 onto the dog's leg; and the width of the tongue panel 28 is such that it extends laterally past the edges 30 of the vertical opening of the calf 24, the calf edges 30 extending generally vertically from the top of the ankle portion 26.

A horizontal strap 32 is shown secured to the boot 20 by being secured to the rear of the calf 24 by a connection 34 shown as hooklike Velcro, of a length sufficient that the strap 32's end 36 which extend from the connection 34 extend far enough that they may be secured together with at least one of those strap ends 36 extending across the front of the boot's said calf portion 24; and the horizontal strap 32 provides a means for making the boot stay on the dog's foot, by the user pulling on the strap ends 36, those strap ends having co-operative Velcro areas for fastening.

As shown, the rear connection 34 is a Velcro strap of a vertical length almost as long as the height of the calf 24, and the central portion of the horizontal strap 32 at the rear of the boot 20 is of a co-operative Velcro texture; thus the strap 32 is connectable optionally at various vertically different locations along the boot's calf portion 24.

Also, preferably as shown, there is provided a strap 38 having ends which are secured to the rear of the calf portion 24 at vertically-spaced locations therealong respectively vertically beyond the respective ends of the rearward connection component 34 of the calf portion 24; and that vertical strap 38 provides both a carrying handle for the boot and a substantial concealment of the connection component 34 of the calf 24.

The support of the vertical strap 38 is by its being secured to the boot's calf portion 24, such as to hold the vertical strap 38 outwardly away from the boot's calf portion 24 and the horizontal strap 32, here by the strap 38's ends being folded inwardly, and with those inwardly folded ends 40 being sewn to the calf 24. This outward position of the vertical strap 38 as shown leaves the horizontal strap 32 free to be moved vertically throughout the portion of the vertical strap 38 between its ends 40 sewn to the boot's calf portion 24; and the vertical strap 38 also thereby minimizes the chance of the hoot nature of the Velcro portion 34 causing it to be caught or snagged, and the rear connection 34 accommodates and provides adjustability as to both the dog leg's diameter and vertical length.

CONCLUSION

It is thus seen that a dog boot article, constructed and used according to the inventive concepts herein set forth, provides novel concepts of a desirable and advantageous device, yielding the advantages of a novel dog boot which provides special and particular advantages as set forth.

In summary as to the nature of the overall article's advantageous concepts, their inventiveness is shown by novel features of concept and construction shown here is advantageous combination and by the novel concepts hereof not only being different from all the prior art known as to dog boots, but the achievement is not what is or has been suggested to those of ordinary skill in the art, especially realistically considering this as a combination comprising components which individually are similar in nature to what is well known to most persons, surely including most of the many makers of footwear and animal's novelties, and of dog owners, for many years, throughout the entire world. No prior art has suggested the modifications of any prior art to achieve the particulars of the novel concepts here achieved, with the special advantages which the overall article provides.

The differences of concept and construction are specified herein, yielding advantages of concepts and of construction; and certainly no particular combination of prior art details as here presented in this overall combination has been suggested by the prior art, this achievement in its particular details being a substantial and advantageous departure from prior art, even though the prior art has had dog boots and similar products for many years. And particularly is the overall difference from the prior art significant when the non-obviousness is viewed by a consideration of the subject matter of this overall device as a whole, as a combination integrally incorporating features different from the prior art, in contrast to merely separate details of novelty themselves, and further in view of the prior art articles not achieving particular advantages here achieved by this combination.

Accordingly, it will thus be seen from the foregoing description of the invention according to this illustrative embodiment, considered with the accompanying drawings, that the present invention provides new and useful concepts of a novel and advantageous dog boot novelty item having and yielding desired advantages and characteristics in formation and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

We claim:

1. A dog boot, comprising, in combination:
   a generally horizontal foot portion;
   the foot portion having a sole along its bottom portion;
   a generally vertical and cylindrical tubular calf portion;
   and an ankle portion interconnecting the foot portion and the said calf portion;
   the said calf portion and ankle portion being of a relatively large cross-sectional size which is large enough to accommodate the passing therethrough of a dog's paw, and of a size and shape such that the lower end of the calf portion generally fits and connects with the upper end of the ankle portion, and the lower end of the ankle portion is of the same general size and shape as the top of the foot portion, and connects therewith;
   and the front of the boot is provided with a vertical panel, extending upwardly from at least as low as the lowest portion of the calf portion, and extending upwardly at least a substantial way toward the top of the calf portion, thus providing a tongue for the boot;
   and in which a horizontal strap is provided, the strap being secured by a connection thereof to the boot, and in which the connection includes co-operable connection components of the strap and of the boot's calf portion, and the connection component of the boot's calf portion extends vertically along the rear of the boot's calf portion, thus providing that the strap may be positioned optionally at various vertically different locations along the calf portion of the boot.

2. The invention as set forth in claim 1 in which the co-operable components of the strap and calf portion are of Velcro type.

3. The invention as set forth in claim 1, in which the combination includes a vertical strap having ends which are secured to the rear of the calf portion at vertically-spaced locations therealong, respectively vertically beyond the respective ends of the connection component of the calf portion, and the said vertical strap providing both a carrying handle for the boot and a substantial concealment of the connection component of the calf portion.

4. The invention as set forth in claim 3, in which the cooperable connection component of the calf portion is a vertically-extending hook-nature component of a Velcro type connection,
   and the support of the said vertical strap by its being secured to the boot's calf portion is such as to hold the vertical strap outwardly away from the boot's calf portion and the horizontal strap, thus leaving the horizontal strap free to be moved vertically throughout the portion of the vertical strap between its ends sewn to the boot's calf portion, and the vertical strap also thereby minimizing the chance of the hook nature of the Velcro causing it to be caught or snagged by such objects as fuzzy material in the vicinity, or to catch the dog's tail.

5. The invention as set forth in claim 1, in which said horizontal strap has a length sufficient that its ends which extend from its connection extend so that they may be secured together with at least one of those strap ends extending across the front of the boot's said calf portion, the horizontal strap providing a means for making the boot to stay on the dog's foot.

6. The invention as set forth in claim 1, in which the calf portion is provided with a vertically-extending opening, and the width of the said vertical tongue panel is such that it extends laterally past the edges of the said opening.

7. A dog boot, comprising, in combination:
   a generally horizontal foot portion;
   the foot portion having a sole along its bottom portion;

a generally vertical and cylindrical tubular calf portion;

and an ankle portion interconnecting the foot portion and the said calf portion;

the said calf portion and ankle portion being of a relatively large cross-sectional size which is large enough to accommodate the passing therethrough of a dog's paw, and of a size and shape such that the lower end of the calf portion generally fits and connects with the upper end of the ankle portion, and the lower end of the ankle portion is of the same general size and shape as the top of the foot portion, and connects therewith;

and the front of the foot is provided with a vertical panel, extending upwardly from at least as low as the lowest portion of the calf portion, and extending upwardly at least a substantial way toward the top of the calf portion, thus providing a tongue for the boot;

in which a horizontal strap is provided, secured to the boot by being secured to the calf portion by a connection provided at the rear thereof, and of a length sufficient that its ends which extend from that connection may be pulled from the said rear connection and secured together to tighten the calf portion for holding various diameters of dogs' legs, the rear connection being of a vertically extending nature so as to provide its holding operativity at various vertically different positions of the strap, the rear connection thus accommodating and providing adjustability as to both the dog leg's diameter and vertical length.

8. A dog boot, comprising, in combination:

a generally horizontal foot portion;

the foot portion having a sole along its bottom portion;

a generally vertical and cylindrical tubular calf portion;

and an ankle portion interconnecting the foot portion and the said calf portion;

the said calf portion and ankle portion being of a relatively large cross-sectional size which is large enough to accommodate the passing therethrough of a dog's paw, and of a size and shape such that the lower end of the calf portion generally fits and connects with the upper end of the ankle portion, and the lower end of the ankle portion is of the same general size and shape as the top of the foot portion, and connects therewith;

and the calf portion being of a flexible nature such that, during placement of the boot onto a dog's leg after the dog's paw has been moved downwardly through the calf portion, the calf portion may be tightened into a relatively smaller cross-sectional size so as to make it appear, by the calf portion then appearing to be significantly smaller in the cross-sectional size than the foot portion and the lower end of the ankle portion, that the dog has a leg and paw whose size and shape relationship is that of a significantly larger paw than the cross-sectional size of the dog's leg;

in which a horizontal strap is provided, secured to the boot by being secured to the boot's calf portion by a connection provided at the rear thereof;

in which there are connection means provided on the rear of the calf portion and cooperative connection means are provided on the said horizontal strap, the said two connection means being area of Velcro type fasteners; and in which the rear connection means is vertically extending and provides for a holding of the boot on the dog's leg in a plurality of optionally chosen vertical placements.

* * * * *